(12) United States Patent
Shin et al.

(10) Patent No.: US 9,652,119 B2
(45) Date of Patent: May 16, 2017

(54) METHOD AND APPARATUS FOR USER INTERFACE BASED ON GESTURE

(71) Applicant: Samsung Electronics Co., Ltd., Suwon-si (KR)

(72) Inventors: Chang-Woo Shin, Hwaseong-si (KR); Hyun Surk Ryu, Hwaseong-si (KR); Jooyeon Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 14/177,956

(22) Filed: Feb. 11, 2014

(65) Prior Publication Data
US 2014/0351753 A1    Nov. 27, 2014

(30) Foreign Application Priority Data
May 23, 2013 (KR) .................. 10-2013-0058491

(51) Int. Cl.
| | |
|---|---|
| *G06F 3/00* | (2006.01) |
| *G06F 3/01* | (2006.01) |
| *G06F 3/0482* | (2013.01) |
| *G06F 3/023* | (2006.01) |
| *G06F 3/0488* | (2013.01) |

(52) U.S. Cl.
CPC ............ *G06F 3/0482* (2013.01); *G06F 3/017* (2013.01); *G06F 3/0236* (2013.01); *G06F 3/0488* (2013.01); *G06F 3/04883* (2013.01); *G06F 3/04886* (2013.01); *G06F 2203/04807* (2013.01)

(58) Field of Classification Search
None
See application file for complete search history.

(56) References Cited

U.S. PATENT DOCUMENTS

| | | | |
|---|---|---|---|
| 5,764,794 | A | 6/1998 | Perlin |
| 7,728,269 | B2 | 6/2010 | Lichtsteiner et al. |
| 8,402,391 | B1 | 3/2013 | Doray et al. |
| 2002/0101458 | A1 | 8/2002 | SanGiovanni |
| 2006/0139314 | A1 | 6/2006 | Bell |

(Continued)

FOREIGN PATENT DOCUMENTS

| | | |
|---|---|---|
| JP | 2012-68854 A | 4/2012 |
| KR | 10-2007-0036077 A | 4/2007 |

(Continued)

OTHER PUBLICATIONS

Extended European Search Report issued on Oct. 9, 2014, in counterpart European Application No. 14167192.5 (12 pages, in English).

*Primary Examiner* — Toan Vu
(74) *Attorney, Agent, or Firm* — NSIP Law

(57) ABSTRACT

A method for a user interface based on a gesture includes setting at least one gesture region including at least one basic region and at least one navigation region based on a preset location or a detected location of at least one object to be tracked, the at least one navigation region including at least one item, detecting a gesture of the at least one object to be tracked using an input device, and recognizing, from the detected gesture, at least one of a select gesture for selecting any one item among the at least one item of the at least one navigation region and a confirm gesture for moving from the at least one navigation region to the at least one basic region.

13 Claims, 16 Drawing Sheets

(56) References Cited

U.S. PATENT DOCUMENTS

| | | |
|---|---|---|
| 2007/0157089 A1* | 7/2007 | Van Os ............... G06F 3/04817 715/702 |
| 2008/0129686 A1 | 6/2008 | Han |
| 2008/0135731 A1 | 6/2008 | Lichtsteiner et al. |
| 2009/0213086 A1* | 8/2009 | Chae .................... G06F 3/0482 345/173 |
| 2010/0192103 A1 | 7/2010 | Cragun et al. |
| 2010/0306702 A1 | 12/2010 | Warner |
| 2011/0074669 A1* | 3/2011 | Marks .................... G06F 3/017 345/156 |
| 2012/0030569 A1 | 2/2012 | Migos et al. |
| 2012/0089948 A1 | 4/2012 | Lim et al. |
| 2012/0151400 A1* | 6/2012 | Hong ................. G06F 3/04817 715/769 |
| 2013/0246955 A1* | 9/2013 | Schwesig ............... G06F 3/017 715/767 |
| 2014/0082489 A1* | 3/2014 | Park ..................... G06F 3/0488 715/702 |
| 2014/0095994 A1* | 4/2014 | Kim ....................... G06F 3/013 715/702 |
| 2014/0108995 A1* | 4/2014 | Sandler ............... G06F 3/04883 715/781 |
| 2014/0282233 A1* | 9/2014 | Sandler ................. G06F 3/0484 715/800 |
| 2014/0372914 A1* | 12/2014 | Byrd ................... G06F 3/04883 715/760 |
| 2015/0067605 A1* | 3/2015 | Zambetti ............... G06F 3/0485 715/830 |

FOREIGN PATENT DOCUMENTS

| | | |
|---|---|---|
| KR | 10-2008-0050352 A | 6/2008 |
| KR | 10-2011-0020807 A | 3/2011 |
| KR | 10-2011-0061187 A | 6/2011 |
| KR | 10-2011-0110361 A | 10/2011 |
| KR | 10-2011-0132313 A | 12/2011 |
| KR | 10-2012-0006976 A | 1/2012 |
| KR | 10-2012-0025487 A | 3/2012 |
| WO | WO 2009/035705 A1 | 3/2009 |

* cited by examiner

FIG. 4B
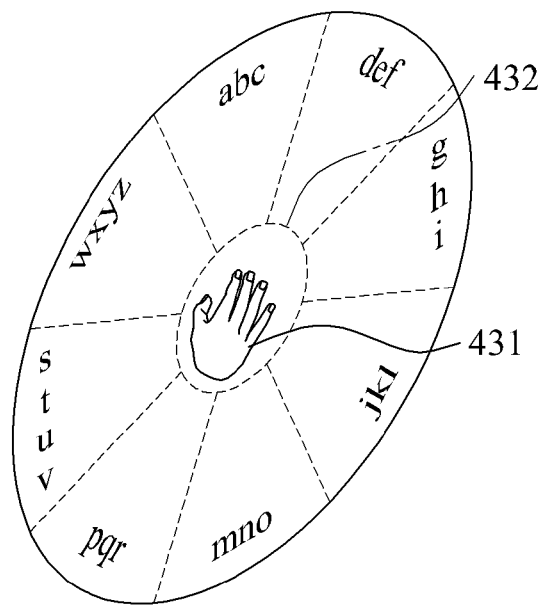
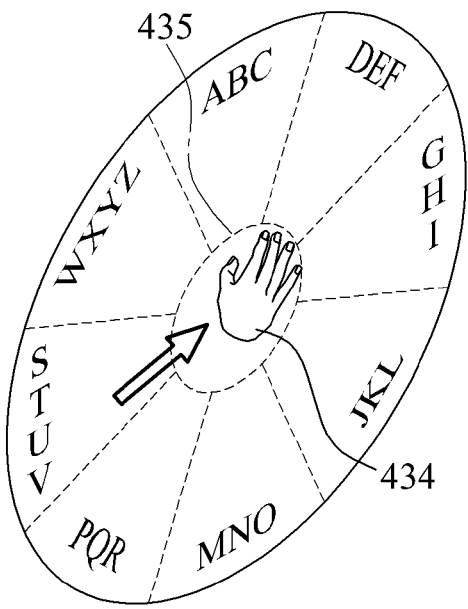
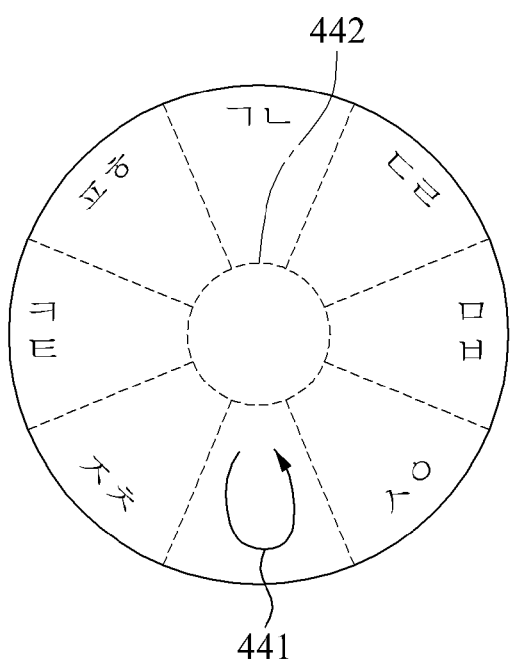
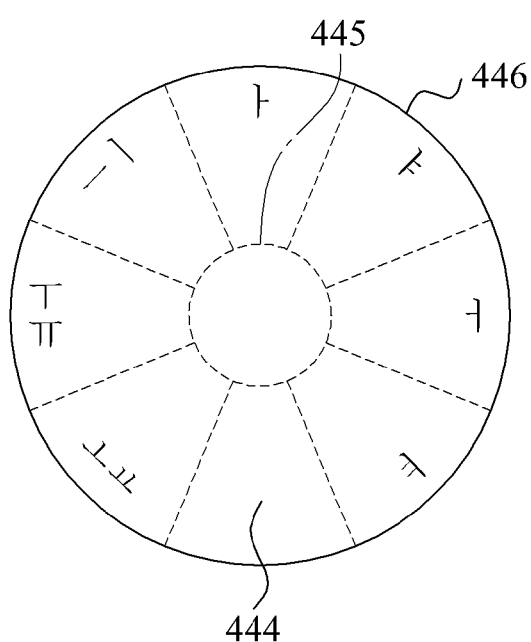

FIG. 6
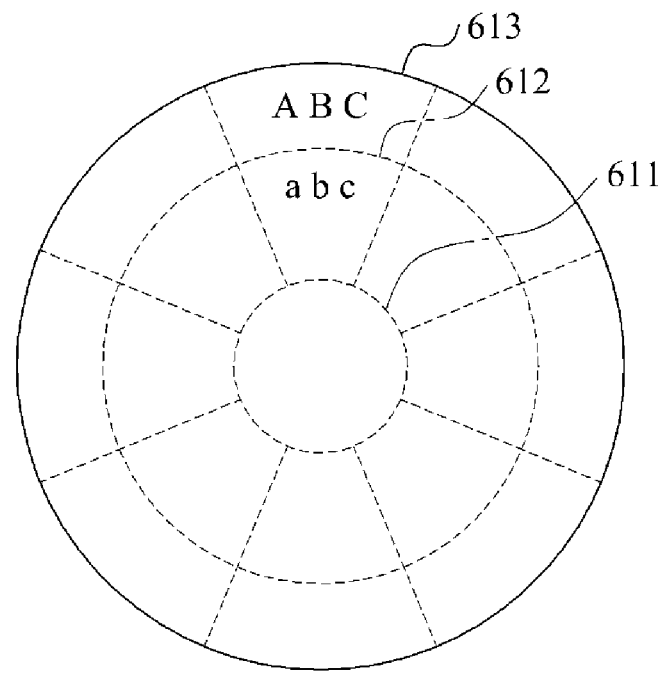
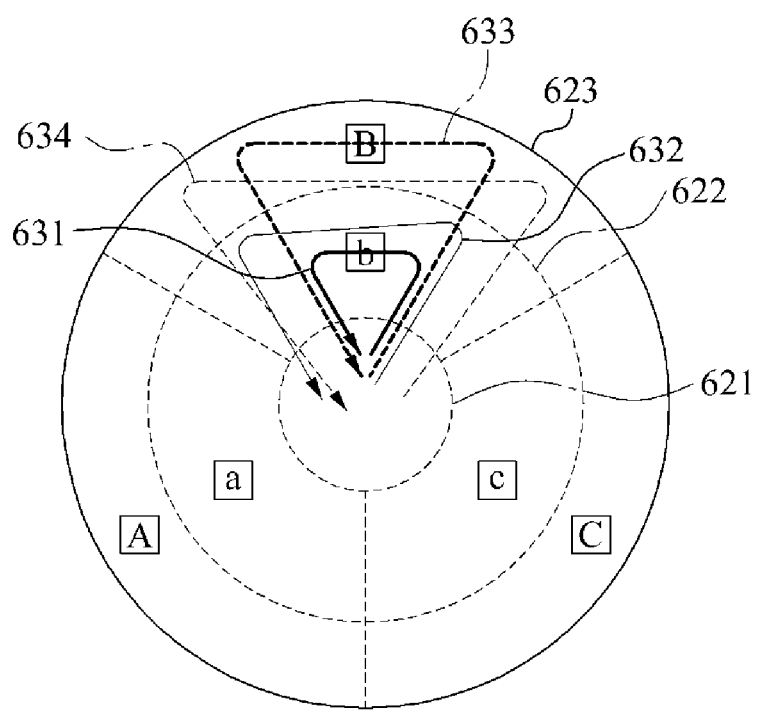

FIG. 10
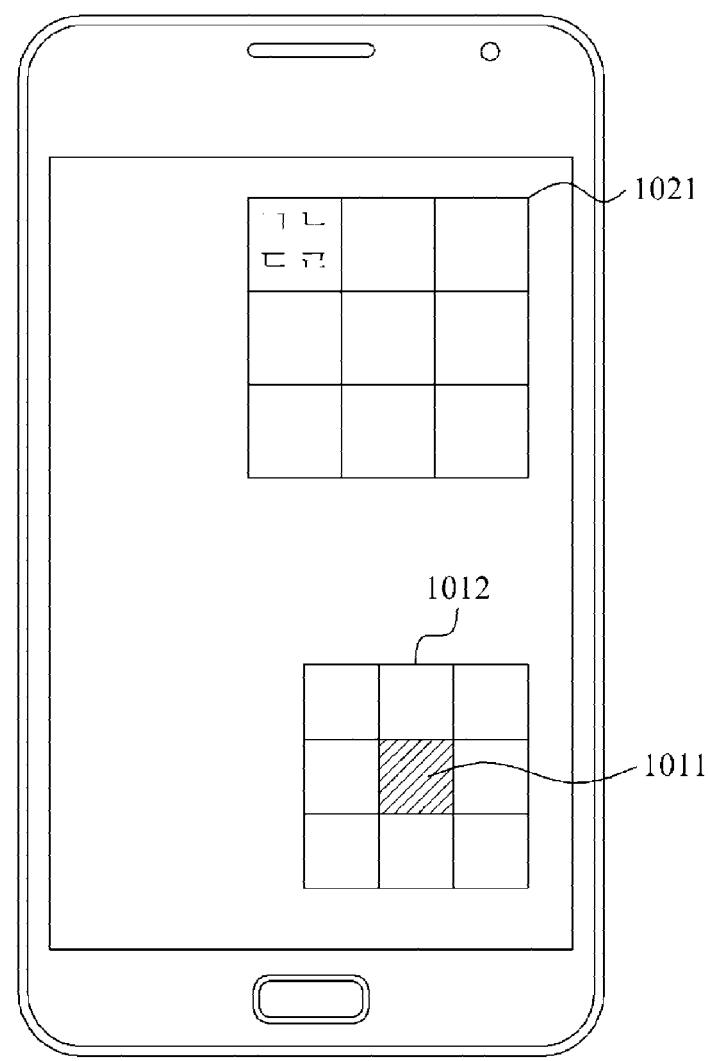
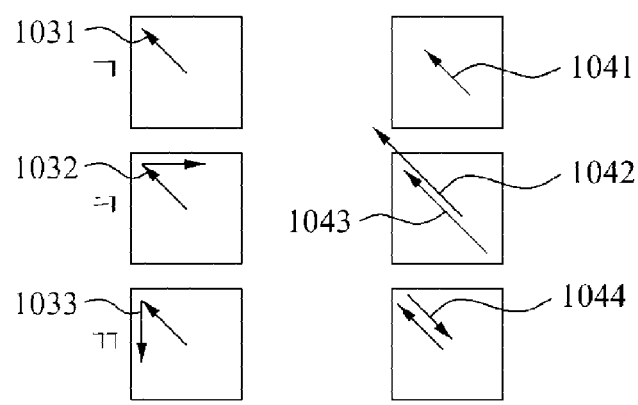

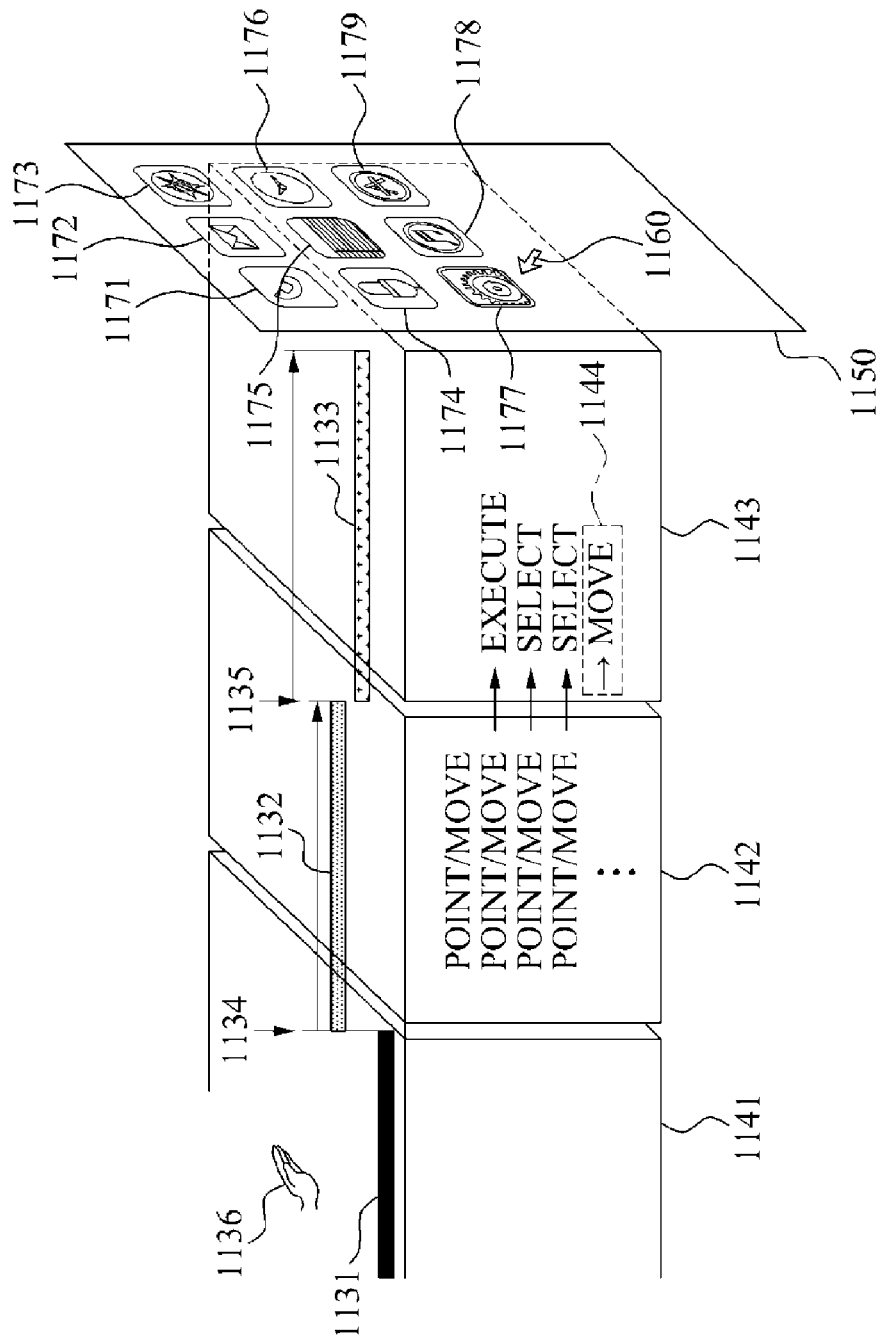

METHOD AND APPARATUS FOR USER INTERFACE BASED ON GESTURE

CROSS-REFERENCE TO RELATED APPLICATIONS

This application claims the benefit under 35 USC 119(a) of Korean Patent Application No. 10-2013-0058491 filed on May 23, 2013, in the Korean Intellectual Property Office, the entire disclosure of which is incorporated herein by reference for all purposes.

BACKGROUND

Field

This application relates to a method and apparatus for a user interface based on a gesture.

Description of Related Art

As advances have been made in a computer-assisted image processing technology and an image recognition technology, various application fields using these technologies have grown. Among such application fields, a gesture recognition technology is one method for information transmission, and there has been a steady progress in the use of this technology. A gesture recognition technology is a technology that enables a computer or robot to analyze and recognize a human behavior autonomously, and includes a touch gesture technology and a spatial gesture technology. A touch gesture technology is a technology that enables a user to select an item using an input device such as a touch screen or other touch input device, and is increasingly being used as the use of smart phones has grown. A spatial gesture technology analyzes a change in motion of an object to be tracked over time using an input device such as a camera or other imaging input device, and interprets the change in an abstract sense.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for a user interface based on a gesture includes setting at least one gesture region including at least one basic region and at least one navigation region based on a preset location or a detected location of at least one object to be tracked, the at least one navigation region including at least one item; detecting a gesture of the at least one object to be tracked using an input device; and recognizing, from the detected gesture, at least one of a select gesture for selecting any one item among the at least one item of the at least one navigation region and a confirm gesture for moving from the at least one navigation region to the at least one basic region.

The setting of the at least one gesture region may include setting any one region among the at least one basic region and the at least one navigation region based on the preset location or the detected location of the at least one object to be tracked; and setting a remaining region among the at least one basic region and the at least one navigation based on a preset rule and the set any one region.

The setting of the at least one gesture region may include setting the at least one gesture region hierarchically.

The recognizing of the at least one of the select gesture and the confirm gesture may include recognizing a navigation region select gesture for moving from the at least one basic region to any one navigation region among the at least one navigation region; and recognizing an item select gesture for selecting any one item among the at least one item of the at least one navigation region.

The recognizing of the at least one of the select gesture and the confirm gesture may include resetting the at least one gesture region in response to the recognizing of the at least one of the select gesture and the confirm gesture; and recognizing the at least one of the select gesture and the confirm gesture from the detected gesture based on the reset at least one gesture region.

The method may further include recognizing a command gesture within the at least one gesture region or within a preset command region other than the at least one gesture region; identifying a command mode corresponding to the recognized command gesture; and performing a function corresponding to the command mode.

The recognizing of the at least one of the select gesture and the confirm gesture may include recognizing the at least one of the select gesture and the confirm gesture based on at least one of a location of the at least one object to be tracked and a direction of movement of the at least one object to be tracked from the at least one basic region to the at least one navigation region, and at least one of a location of the at least one object to be tracked and a direction of movement of the at least one object to be tracked from the at least one navigation region to the at least one basic region.

The recognizing of the at least one of the select gesture and the confirm gesture may further include recognizing the at least one of the select gesture and the confirm gesture based on at least one of information associated with a motion of the at least one object to be tracked within the at least one gesture region, information associated with a moving trace of the least one object to be tracked, information associated with a movement speed of the least one object to be tracked, and information associated with a shape of the at least one object to be tracked.

The recognizing of the command gesture may include recognizing the command gesture based on at least one of information associated with a motion of the at least one object to be tracked within the at least one gesture region, information associated with a moving trace of the at least one object to be tracked, information associated with a movement speed of the at least one object to be tracked, and information associated with a shape of the at least one object to be tracked.

The recognizing of the command gesture may include recognizing a cancel gesture for canceling the recognition of the select gesture or the confirm gesture.

The cancel gesture may include at least one of any one gesture among at least one preset cancel gesture, a gesture for moving to a region other than a preset region, and a gesture for unexecuting the confirm gesture during a preset period of time.

The input device may include at least one of a camera, a detection sensor, and an event-based image processing device.

The event-based image processing device may include a dynamic vision sensor (DVS).

The method may further include feeding back the at least one gesture region to a user in real time using an output device including at least one of a display device, an audio device, a tactile device, an olfactory device, a gustatory device, an electric device, and a magnetic device.

The at least one object to be tracked may be a physical object or a virtual object.

In another general aspect, a method for a user interface based on a touch gesture includes detecting at least one touch gesture and at least one slide gesture using a touch screen; setting at least one gesture region based on a preset location or an initial location of the at least one touch gesture; and recognizing an input gesture based on at least one of a location of the at least one touch gesture within the at least one gesture region and a direction of the at least one slide gesture within the at least one gesture region.

The recognizing of the input gesture may include recognizing the input gesture based on at least one of a length of the at least one slide gesture and a speed of the at least one slide gesture.

In another general aspect, a method for a user interface based on a gesture includes setting at least one gesture region including at least one basic region and at least one navigation region based on a preset location or a detected location of at least one object to be tracked, the at least one navigation region including at least one character; detecting a gesture of the at least one object to be tracked using an input device; and recognizing, from the detected gesture, at least one of a character select gesture for selecting any one character among the at least one character of the at least one navigation region and a character confirm gesture for moving from the at least one navigation region to the at least one basic region.

In another general aspect, a method for a user interface based on a gesture includes setting at least two regions of a gesture region based on a depth from a preset location or a location of at least one object to be tracked; recognizing location information and a gesture of the at least one object to be tracked within the gesture region, the location information including information associated with a depth from the preset location or the location of at least one object to be tracked; and recognizing at least one function among a plurality of functions corresponding to the at least two regions based on the location information and the gesture of the at least one object to be tracked.

The plurality of functions corresponding to the at least two regions include a "move" function, a "point" function, a "select" function, an "execute" function, and a "command" function.

The setting of the at least two regions may include setting at least one reference plane based on the location of the at least one object to be tracked; and setting the at least two regions based on the at least one reference plane.

The setting of the at least two regions may include setting the at least two regions based on a relative position between the at least one object to be tracked and a display.

The plurality of functions corresponding to the at least two regions include a function corresponding to a movement of the at least one object to be tracked between the at least two regions.

The recognizing of the at least one function among the plurality of functions corresponding to the at least two regions may include setting a motion mode based on a movement speed of the at least one object to be tracked, the motion mode being selected from a navigation mode and a command mode; and recognizing at least one function among the plurality of functions corresponding to the motion mode.

The method may further include performing the recognized at least one function on at least one item among a plurality of items.

In another general aspect, a method for a user interface based on a gesture includes setting a gesture region and an inactive region; ignoring any gesture of any object within the inactive region; detecting a gesture of an object to be tracked within the gesture region using an input device; and recognizing a gesture for performing a function from the detected gesture.

The gesture region may include a plurality of regions; one of the regions may include a plurality of items; and the recognizing of the gesture may include recognizing the gesture based on the detected gesture as one of a plurality of gestures including a gesture for selecting one of the items, a gesture for moving between two of the regions, and a gesture for confirming a selection of one of the items.

Other features and aspects will be apparent from the following detailed description, the drawings, and the claims.

BRIEF DESCRIPTION OF THE DRAWINGS

FIGS. 4A and 4B are diagrams illustrating examples of a command mode.

FIG. 6 is a diagram illustrating examples of recognition of a select gesture and a confirm gesture based on a moving trace of an object to be tracked.

FIG. 10 is a diagram illustrating another example of a method for a user interface based on a touch gesture.

FIGS. 11A and 11B are diagrams illustrating another example of a method for a user interface based on a gesture.

DETAILED DESCRIPTION

Figure 1:
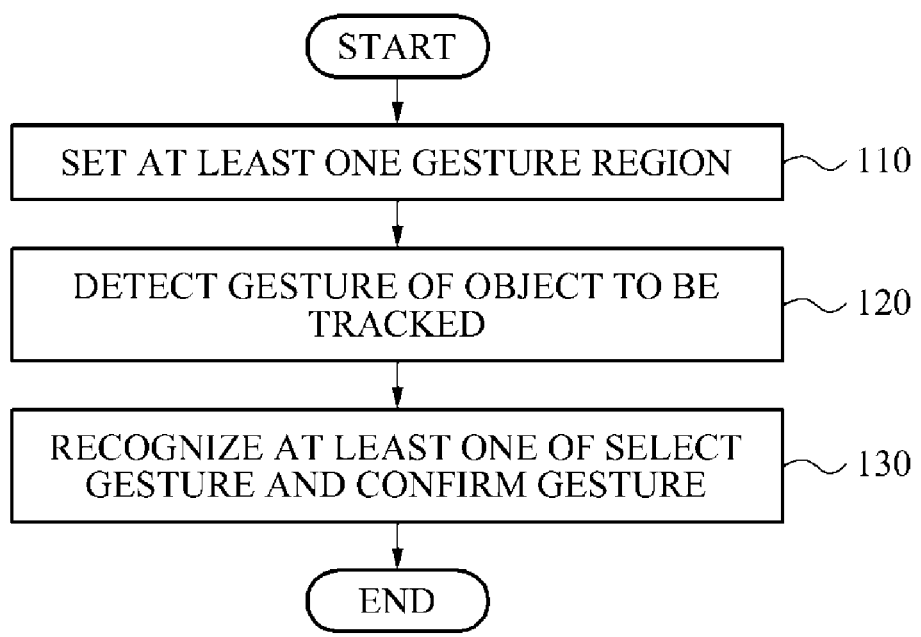
FIG. 1 is a flowchart illustrating an example of a method for a user interface based on a gesture.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

In this application, expressions of the form "at least one of A and B" and "at least one of A, B, and C" are to be interpreted as covering any one of the listed items and any combination of any two or more of the listed items.

FIG. 1 is a flowchart illustrating an example of a method for a user interface based on a gesture. Referring to FIG. 1, in 110, at least one gesture region including at least one basic region and at least one navigation region are set based on a preset location or a detected location of at least one object to be tracked. The object to be tracked may be an object of which a location and a motion are to be detected, and may be a physical object or a virtual object. For example, the physical object may be an object that exists physically in a real world, for example, hands, feet, and a face of a human or a thing. The virtual object may be an object that does not exist physically in a real world, but is displayed on a display device, and has a location and a motion in a virtual world that may be controlled by a user. The object to be tracked may be singular or plural. For example, when a gesture is executed using both hands, two objects may be tracked.

The gesture region may be a region in which the location and the motion of the object to be tracked are detected and recognized. Specifically, the gesture region may be set in a space or on a plane or a line. A location of the gesture region may be set at a preset location, and may be set based on a preset rule. For example, the preset rule may include a method of setting the location of the gesture region based on a location input from the user, a method of setting the location of the gesture region based on the detected location of the object to be tracked, or any other method of setting the location of the gesture region. The gesture region may include a basic region and a navigation region. The basic region may be a region that is a reference region of the gesture region, and may be a start region and an end region for gesture recognition. The navigation region may be a region for navigation and selection of an item based on a gesture, and may include at least one group and at least one item. At least one basic region and at least one navigation region may be present within the gesture region.

More specifically, any one region among the at least one basic region and the at least one navigation region may be set based on the preset location or the detected location of the at least one object to be tracked. For example, when the location of the object to be tracked is detected, a region around the detected location may be set as a basic region. Based on the set any one region, a remaining region among the at least one basic region and the at least one navigation may be set based on the preset rule. For example, when a navigation region is set based on the preset location or the detected location of the at least one object to be tracked, a remaining region may become a basic region, and the basic region may be set based on the preset rule and the set navigation region. Also, when a basic region is set based on the preset location or the detected location of the at least one object to be tracked, a navigation region may be set based on the preset rule and the set basic region.

As another example, when a location of the basic region is set, a location of the navigation region may be determined relative to the location of the basic region. Also, the location of the navigation region may be set arbitrarily by the user. As a specific example, in a case in which the user swings a hand, a location of the hand may be detected and a region around the detected hand may be set as a basic region. A neighboring region of the basic region may be set as a navigation region.

The at least one gesture region may be set hierarchically. Specifically, a plurality of gesture regions may be set hierarchically based on a correlation of each gesture region. For example, in a case in which three gesture regions are set, a second gesture region may be a submenu of a first gesture region, and a third gesture region may be a submenu of the second gesture region, and the three gesture regions may be set hierarchically in an order of the first gesture region, the second gesture region, and the third gesture region. When the user selects any one navigation region in the first gesture region, the second gesture region may be called out by resetting the gesture region as will be described later, and the third gesture region may be called out by resetting the gesture region again. As another example, hierarchical gesture regions may be set based on a depth in a space. The user may execute a gesture in a desired gesture region classified by the depth.

The at least one gesture region may be fed back to the user. Specifically, at least one of the gesture region, its configuration, and a process for gesture detection and recognition may be fed back to the user in real time using an output device including at least one of a display device, an audio device, a tactile device, an olfactory device, a gustatory device, an electric device, and a magnetic device. The tactile device may include a haptic device and a temperature device. For example, in a case in which the user stretches a hand, a region around a location of the hand may be set as a basic region, and as a visual feedback, the set basic region may be provided to the user visually using a display device. After a neighboring region of the basic region is set as a navigation region, the set navigation region may be fed back to the user visually using the display device. By referring to the basic region and the navigation region being fed back, the user may move from the basic region to the navigation region by moving the hand. The gesture region may be reset in response to recognition of at least one of a select gesture and a confirm gesture, and the reset gesture region may be fed back to the user visually. Accordingly, the user may execute a gesture in the gesture region fed back visually through a display image or the reset gesture region. As another example, in a case in which a "noodles" item, a "pizza" item, and a "fried chicken" item are included in the navigation region, the user may select any one item among "noodles", "pizza", and "fried chicken" using the gesture region. The method for a user interface based on a gesture may be implemented to feed back the item selected by the user auditorily using an audio device. Also, the method for a user interface based on a gesture may be implemented to provide, as an olfactory feedback, a smell of the item selected by the user using an olfactory device, and as a gustatory feedback, a taste of the item selected by the user using a gustatory device, for example, an electronic tongue. As another example, the method for a user interface based on a gesture may be implemented to provide a tactile feedback on whether the object to be tracked, for example, the hand of the user, is located in the basic region or the navigation region. For this, when the object to be tracked is located in the basic region, the method for a user interface based on a gesture may be implemented to provide a weak vibration to the user, and when the object to be tracked is located in the navigation region, may be implemented to provide a strong vibration to the user.

In 120, a gesture of the at least one object to be tracked may be detected using an input device. The gesture of the object to be tracked may include at least one of a location and a motion of the object to be tracked. Specifically, a location, a movement direction, a moving trace, a movement speed, and a shape of the object to be tracked may be detected. The gesture of the object to be tracked may be detected using the input device. The input device may include at least one of a camera, a detection sensor, and an event-based image processing device. More specifically, the detection sensor may include an optical sensor, an accelerometer sensor, a gyro sensor, a proximity sensor, a depth sensor, or any other sensor known to one of ordinary skill in the art capable of detecting the gesture of the object to be tracked. The event-based image processing device may include a dynamic vision sensor (DVS). For example, in a case in which the gesture of the object to be tracked is detected using a DVS, the location and the movement direction of the object to be tracked may be detected rapidly by extracting a motion of the object to be tracked after detecting only a change in light. Also, the input device may include an external input device such as, for example, a joystick, a mouse, or any other external input device known to one of ordinary skill in the art.

In one example, a gesture executed outside the set gesture region may not be detected, and only a gesture executed inside the gesture region may be detected. For example, in a case in which a range a stretched arm can reach from a current location of the user is set as a gesture region, a gesture within the reach of the arm may be detected as the gesture of the object to be tracked. Through this, an intent of the user may be understood correctly, and an error in gesture recognition may be prevented.

In 130, at least one of the select gesture for selecting any one item among at least one item included in the at least one navigation region and the confirm gesture for moving from the at least one navigation region to the basic region may be recognized from the detected gesture. The item may be an entity that may be controlled by the user using the gesture, and may include a character, a word, an image, a video, or any other entity known to one of ordinary skill in the art that may be controlled by the user using the gesture. Specifically, the select gesture may include a gesture for moving from the at least one basic region to any one navigation region among the at least one navigation region and a gesture for selecting any one item among at least one item included in the any one navigation region. For example, in a case in which one basic region and four navigation regions are set to be included in a gesture region, a gesture for selecting one navigation region among the four navigation regions may be recognized from the detected gesture. In a case in which the selected navigation region includes three items, a gesture for selecting any one item among the three items may be recognized from the detected gesture.

In a case in which a gesture for moving from the at least one basic region to any one navigation region among the at least one navigation region is recognized, the at least one gesture region may be reset in response to the recognition of the gesture. The reset gesture region may be different from the gesture region before the resetting. For example, the reset gesture region may have a different number of basic regions and navigation regions than the gesture region before the resetting. Also, the reset gesture region and the gesture region before the resetting may include different items. When the gesture region is reset, at least one of the select gesture and the confirm gesture may be recognized from the detected gesture based on the reset gesture region.

A hierarchical menu may be configured by the resetting of the gesture region. For example, in a case in which resetting of the gesture region three times is required to select a particular item, a first gesture region may become a first menu, and a second gesture region may become a second menu as a submenu of the first menu. Each of the first menu and the second menu may be called out using a gesture for selecting a particular item. A third gesture region may become a third menu, and the user may select an item included in the third gesture region using a gesture for selecting a particular menu and a gesture for selecting a particular item.

The at least one of the select gesture and the confirm gesture may be recognized based on at least one of a location and a direction of movement of the at least one object to be tracked from the at least one basic region to the at least one navigation region and at least one of a location and a direction of movement of the at least one object to be tracked from the at least one navigation region to the at least one basic region. For example, the user may move from a basic region to a navigation region including a particular item to select an item desired by the user. At least one of the location and the direction of movement of the object to be tracked may differ based on a location of the item. When a confirm gesture for moving from the navigation region including the particular item to the basic region is executed, at least one of the location and the direction of movement of the object to be tracked may differ based on the location of the item. This may imply that at least one of a particular location and a particular movement direction of the object to be tracked is required to recognize the selection for each item. Based on at least one of the location and the direction of the select gesture and at least one of the location and the direction of the confirm gesture, at least one of the select gesture and the confirm gesture may be recognized. The recognition of the at least one of the select gesture and the confirm gesture may be further based on at least one of information associated with a motion, a moving trace, and a movement speed of the object to be tracked in the gesture region, and information associated with a shape of the object to be tracked. The information associated with the motion may represent a particular motion of the object to be tracked within the basic region or navigation region, for example, a motion of shaking the object to be tracked, a motion of rotating the object to be tracked in a clockwise or counterclockwise direction, a motion of pushing or pulling the object to be tracked, and in a case in which the object to be tracked is a hand, a motion of opening or closing the hand. The information associated with the motion, the information associated with the moving trace, the information associated with the movement speed, and the information associated with the shape of the object to be tracked may be used in a command mode that will be described later, and may be used to recognize a command gesture or a cancel gesture.

The command mode may be provided for convenience of the user. The command mode may be a state of allowing selection of a particular item, and an item included in the gesture region may differ based on the command mode. Specifically, any one command gesture among at least one preset command gesture may be recognized within the basic region or a preset command region other than the basic region. The command gesture may be recognized based on at least one piece of information among information associated with a motion within the at least one gesture region of the at least one object to be tracked, information associated with a moving trace, information associated with a movement speed, and information associated with a shape of the at least one object to be tracked. The command gesture may include a cancel gesture that will be described later.

The command mode corresponding to the recognized command gesture may be identified, and a function corresponding to the command mode may be performed. Examples of the function corresponding to the command mode may include repetition and cancellation of the recognition of the select gesture, and in a case in which the item is a character, may include a Korean/English switch, a capital/small letters switch, a stroke addition, a single/double consonant conversion, or any other command relating to a character.

A cancel gesture for canceling the recognition of the select gesture may be recognized. The cancel gesture may include at least one of any one gesture among at least one preset cancel gesture, a gesture for moving to a region other than a preset region, and a gesture for unexecuting the confirm gesture during a preset period of time. Also, the cancel gesture may be included in the command gesture.

A touch gesture may be used. Specifically, at least one touch gesture and at least one slide gesture may be detected using a touch screen. The at least one gesture region may be set based on a preset location or an initial location of a touch gesture, and based on the gesture region, an input gesture may be recognized based on at least one of a location of the at least one touch gesture and a direction of the at least one slide gesture. In addition to the at least one of the location of the touch gesture and the direction of the slide gesture, the recognition of the input gesture may be further based on at least one of a length and a speed of the slide gesture.

Figure 2:
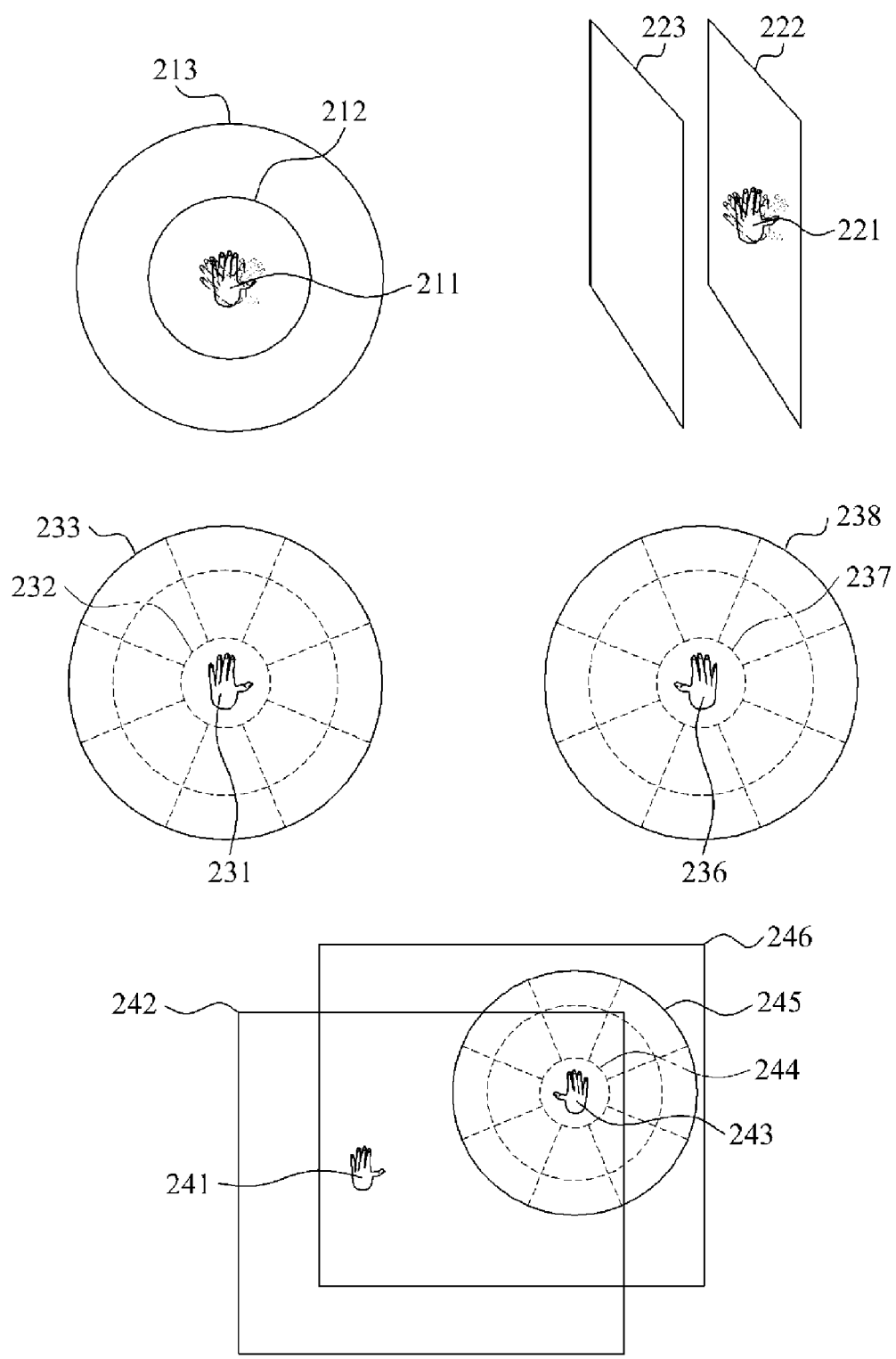
FIG. 2 is a diagram illustrating examples of a gesture region.

FIG. 2 is a diagram illustrating examples of a gesture region. Referring to FIG. 2, a gesture region may have an arbitrary location, size, and shape in a space or on a plane or line. Specifically, a basic region may be set based on a preset location or a detected location of an object to be tracked. Based on the location of the basic region, at least one navigation region may be set based on a preset rule.

For example, in a case of one object to be tracked, a basic region 212 and a navigation region 213 may be set in a same space based on a location of an object 211 to be tracked. Also, a basic region 222 and a navigation region 223 may be set in different spaces based on a location of an object 221 to be tracked. The basic region 222 and the navigation region 223 may have different depths, for example, different distances between the object 211 to be tracked and a display for providing visual feedback information, and a user may execute a select gesture and a navigation gesture based on the different depths.

Even in a case of a plurality of objects to be tracked, a method for a user interface based on a gesture may be applied. For example, in a case in which objects 231 and 236 to be tracked are both hands, basic regions 232 and 237 may be set based on locations of a left hand and a right hand, respectively. Based on the locations of the basic regions 232 and 237, navigation regions 233 and 238 may be set based on a preset rule.

As another example, the gesture region may be set as different regions for each of the objects 231 and 236 to be tracked. Specifically, in a case in which an object 241 to be tracked is a left hand, a basic region 242 and a navigation region 246 may be set in different spaces. In a case in which an object 243 to be tracked is a right hand, a basic region 244 and a navigation region 245 may be set in a same space, dissimilar to the case in which the object 241 to be tracked is a left hand. As a further example, the navigation region 246 when the object 241 to be tracked is a left hand may be set in the same space as the navigation region 245 when the object 243 to be tracked is a right hand.

Figure 3:
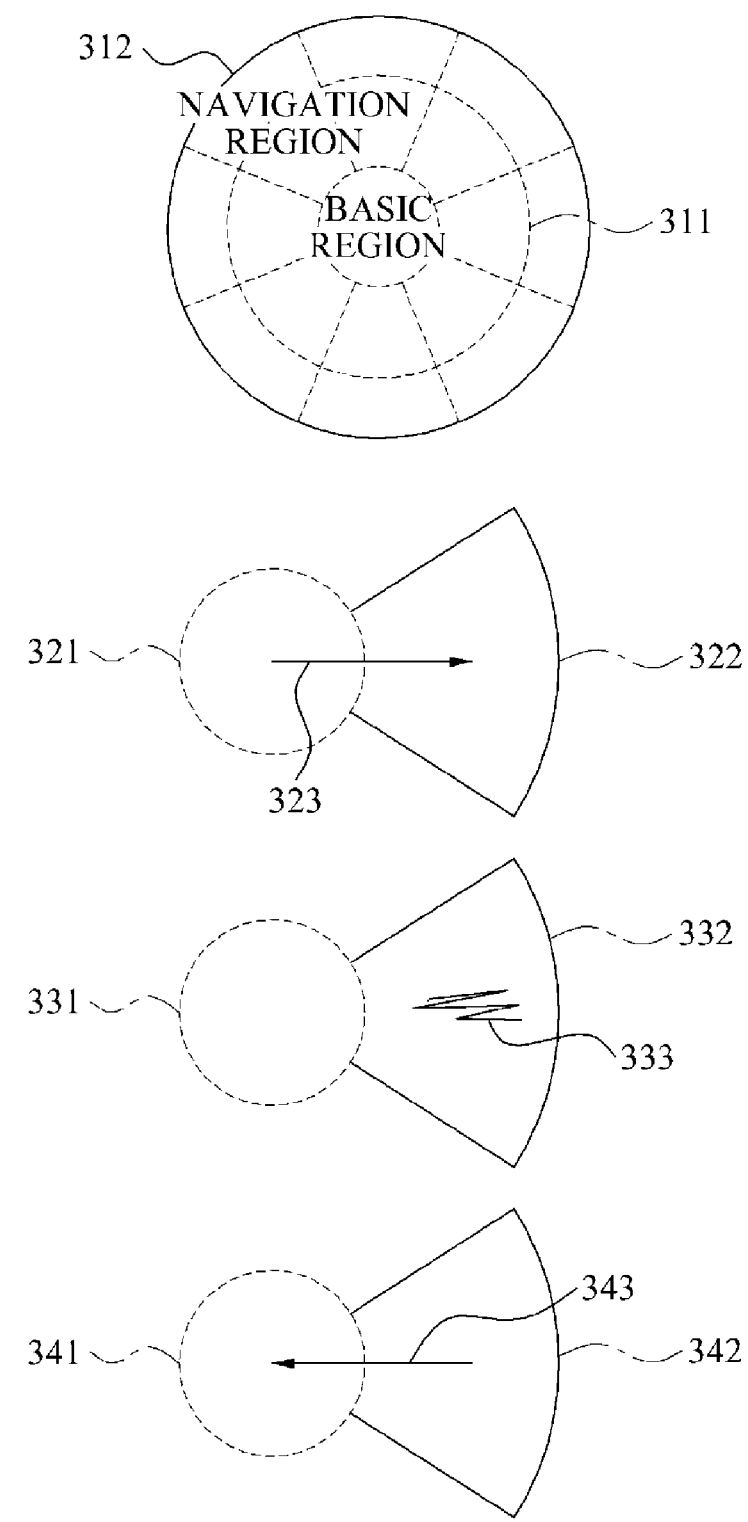
FIG. 3 is a diagram illustrating examples of recognition of at least one of a select gesture and a confirm gesture.

FIG. 3 is a diagram illustrating examples of recognition of at least one of a select gesture and a confirm gesture. Referring to FIG. 3, a gesture region may include at least one basic region 311 and at least one navigation region 312. For example, in a case of one basic region 311 and eight navigation regions 312, an object to be tracked may be moved from the basic region 311 to one navigation region 322 among the eight navigation regions 312. In a case in which the navigation region 322 includes a plurality of items, a gesture 323 may be recognized as a gesture for moving from a basic region to any one navigation region among navigation regions. In a case in which only one item is located in the navigation region 322, the gesture 323 may be recognized as a gesture for selecting the item.

Alternatively, a shaking gesture 333 in a navigation region 332 or a basic region 331dxdxxxxx may be recognized as a gesture for selecting an item.

A gesture 343 for moving from a navigation region 342 to a basic region 341 may be recognized as a confirm gesture. By recognizing the confirm gesture, an intent of the user may be judged correctly, and recognizing an unintended motion as a gesture may be prevented.

Figure 4A:
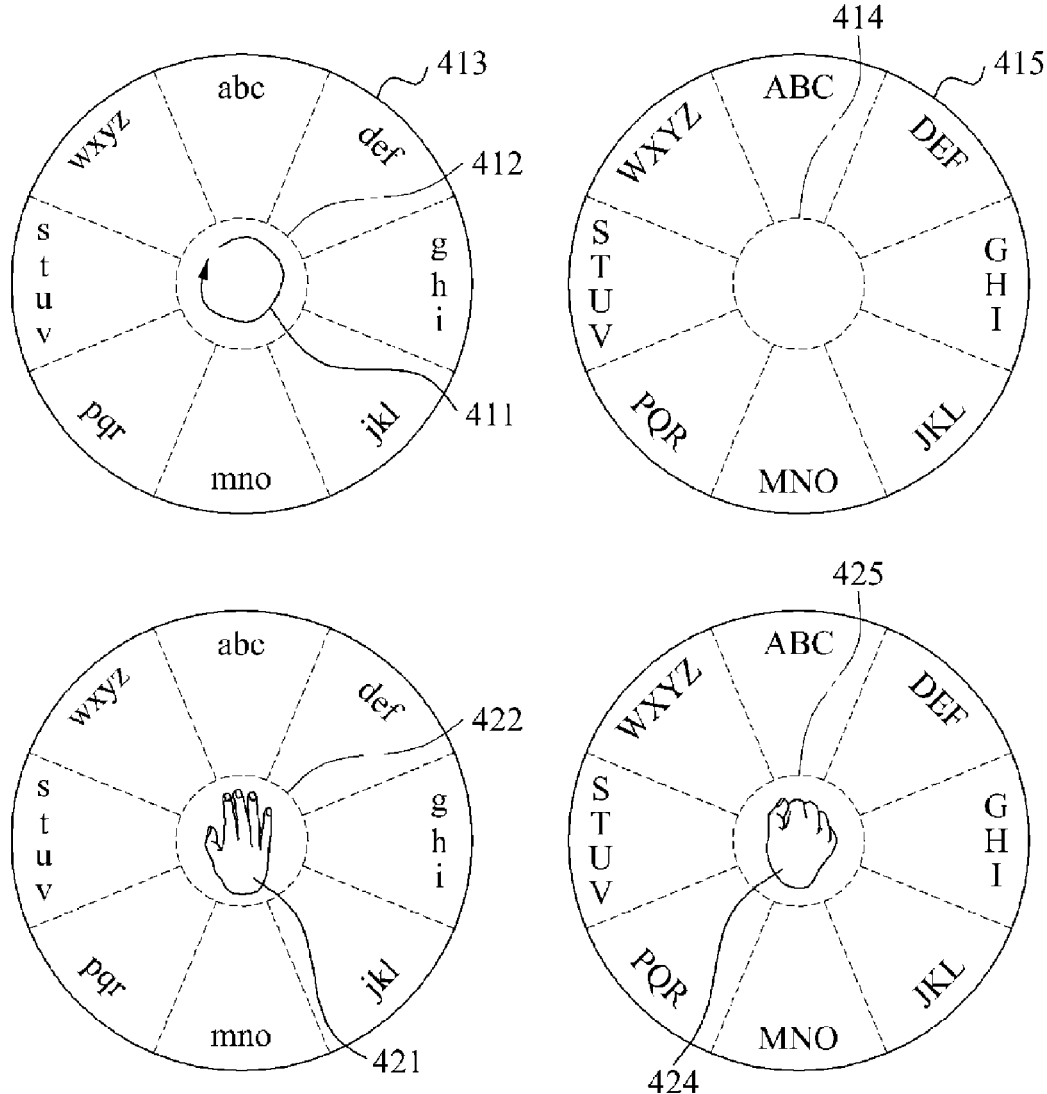

FIGS. 4A and 4B are diagrams illustrating examples of a command mode. Referring to FIG. 4A, a command mode may be identified by recognizing any one command gesture among at least one preset command gesture in at least one basic region or a preset command region other than the basic region. At least one gesture region corresponding to the identified command mode may be reset.

For example, in a case in which an item is a small letters alphabet, a navigation region 413 may include the small letters alphabet. To select a capital letters alphabet, a user may execute a gesture 411 for rotating in a clockwise direction that is one of the at least one preset gesture in a basic region 412. A command mode corresponding to the gesture 411 may be identified, and a visual feedback for selecting the capital letters alphabet may be provided to the user. Accordingly, the user may select the capital letters alphabet using gesture regions 414 and 415.

As another example, the user may execute gestures 421 and 424 for opening and closing a hand of the user corresponding to one of the preset command gestures in basic regions 422 and 425. A command mode corresponding to the gesture 424 in the basic region 425 may be identified, and a visual feedback for selecting the capital letters alphabet may be provided to the user.

Referring to FIG. 4B, when the user executes gestures 431 and 434 for pushing a hand corresponding to one of the preset command gestures in basic regions 432 and 435, a command mode corresponding to the gestures 431 and 434 may be identified, and a visual feedback for selecting the capital letters alphabet may be provided to the user. When the user executes a gesture for pulling a hand in the basic region 435, a visual feedback for selecting the small letters alphabet may be provided to the user.

As another example, in a case in which Korean consonants are displayed, when the user wants to select Korean vowels, the user may execute a command gesture 441 in a preset command region other than a basic region 442. When the user executes the command gesture 441, the command gesture may be recognized and a command mode corresponding to the command gesture 441 may be identified. Accordingly, a visual feedback for selecting Korean vowels in gesture regions 444, 445, and 446 may be provided to the user through a display.

Figure 5:
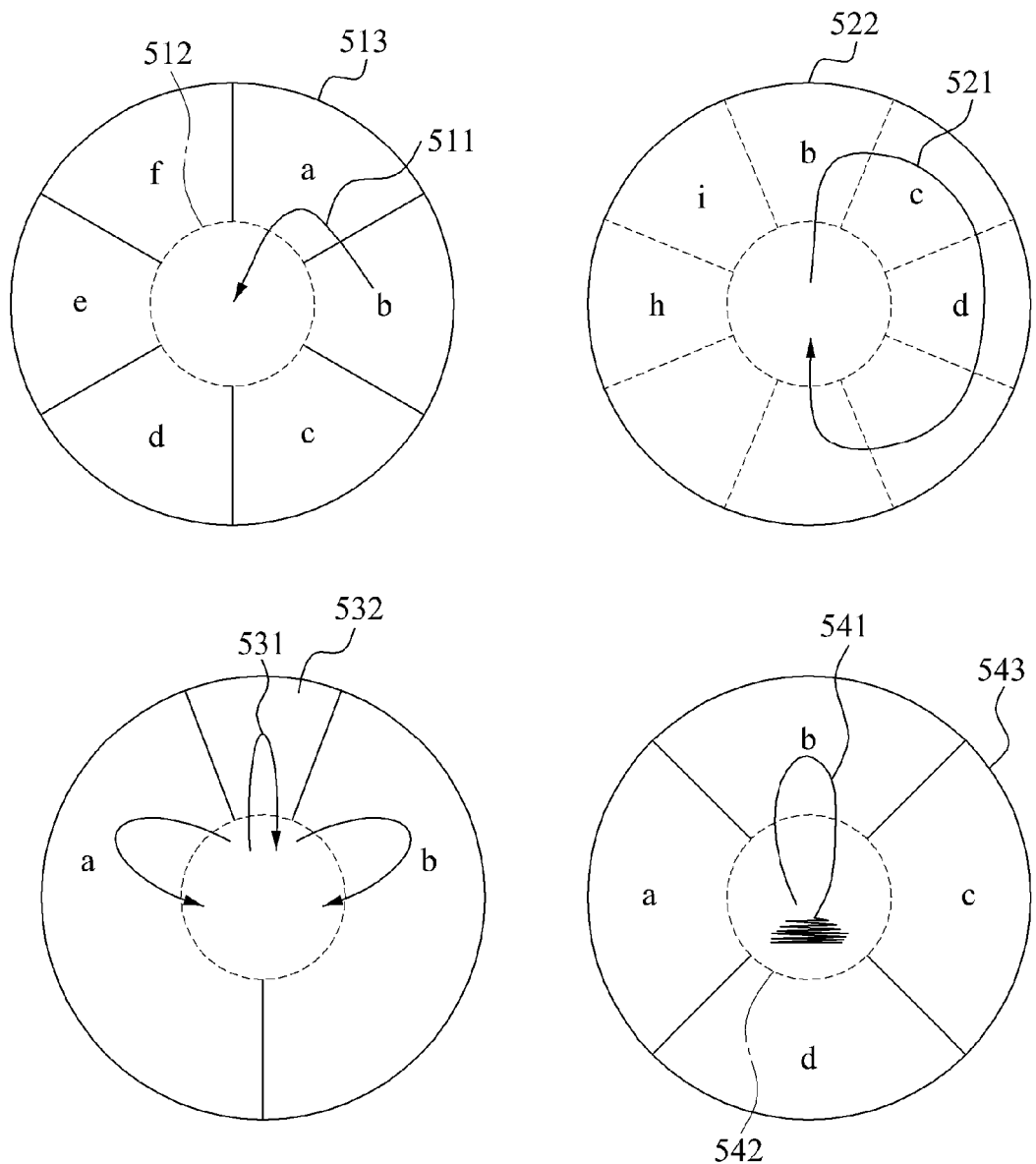
FIG. 5 is a diagram illustrating examples of recognition of a cancel gesture.

FIG. 5 is a diagram illustrating examples of recognition of a cancel gesture. Referring to FIG. 5, a cancel gesture for canceling recognition of a select gesture may be recognized. The cancel gesture may include at least one of any one gesture among at least one preset cancel gesture, a gesture for moving to a region other than a preset region, and a gesture for unexecuting a confirm gesture during a preset period of time. The cancel gesture may be included in a command gesture. For example, a gesture 511 for moving to a basic region 512 from a navigation region 513 rather than from the basic region 512 may be recognized as a cancel gesture. As another example, a gesture 521 for moving across regions rather than within a preset region, for example, a navigation region 522, may be recognized as a cancel gesture for canceling an item selected by a user.

Also, a select gesture and a confirm gesture 531 in a null region 532 may be recognized as a cancel gesture. As another example, a shaking gesture 541 in a basic region 542 or a navigation region 543 may be recognized as a cancel gesture. Also, a gesture for unexecuting a confirm gesture during a preset period of time after executing a select gesture may be recognized as a cancel gesture.

FIG. 6 is a diagram illustrating examples of recognition of a select gesture and a confirm gesture based on a moving trace of an object to be tracked. Referring to FIG. 6, at least one navigation region may include different items based on a depth. As described in the foregoing, the depth may be a distance between an object to be tracked and a display for providing visual feedback information. The deeper the depth, the longer the distance between the display and the object to be tracked, and the shallower the depth, the shorter the distance between the display and the object to be tracked. For example, an item of a navigation region 612 having a shallow depth from a basic region 611 may correspond to a small letters alphabet, and an item of a navigation region 613 having a deep depth from the basic region 611 may correspond to a capital letters alphabet. Also, when a gesture for moving from a basic region to any one navigation region among navigation regions is recognized, the basic region 611 and the navigation regions 612 and 613 may be reset as a basic region 621 and navigation regions 622 and 623. When gestures 631 and 632 having a short moving trace in the gesture regions 621 and 623 are detected, the gestures 631 and 632 may be recognized as a gesture for selecting a small alphabet letter 'b'. Specifically, a user may execute the gesture 631 or 632 to select the small alphabet letter 'b'. Even though both the gestures 631 and 632 correspond to a gesture for selecting the small alphabet letter 'b', a location or direction of an outward movement from the basic region 621 to the navigation region 622 may differ, and a location or direction of an inward movement from the navigation region 622 to the basic region 621 may also differ. The gestures 631 and 632 may be recognized as different gestures. To improve a gesture recognition ratio, at least one of the location and the direction of movement of the object to be tracked from the basic region 621 to the navigation region 622 and at least one of the location and the direction of movement of the object to be tracked from the navigation region 622 to the basic region 621 may be used in gesture recognition, considering an intent of the user and a measuring method. When the user executes the gesture 631, the gesture of the user may be recognized correctly based on the location or direction of movement of the object to be tracked from the basic region 621 to the navigation region 622 and the location or direction of inward movement of the object to be tracked from the navigation region 622 to the basic region 621, and when the user executes the gesture 632, the gesture of the user may be recognized correctly based on the location or direction of movement of the object to be tracked from the basic region 621 to the navigation region 622 and the location or direction of inward movement of the object to be tracked from the navigation region 622 to the basic region 611.

Also, when gestures 633 and 634 having a long moving trace are detected, the gestures 633 and 634 may be recognized as a gesture for selecting a capital alphabet letter 'B'. Similar to the foregoing description, a recognition ratio of the gestures 633 and 634 may be increased by recognizing at least one of a location and a direction of movement of the object to be tracked from the basic region 621 to the navigation region 623 and at least one of a location and a direction of movement of the object to be tracked from the navigation region 623 to the basic region 621.

Figure 7:
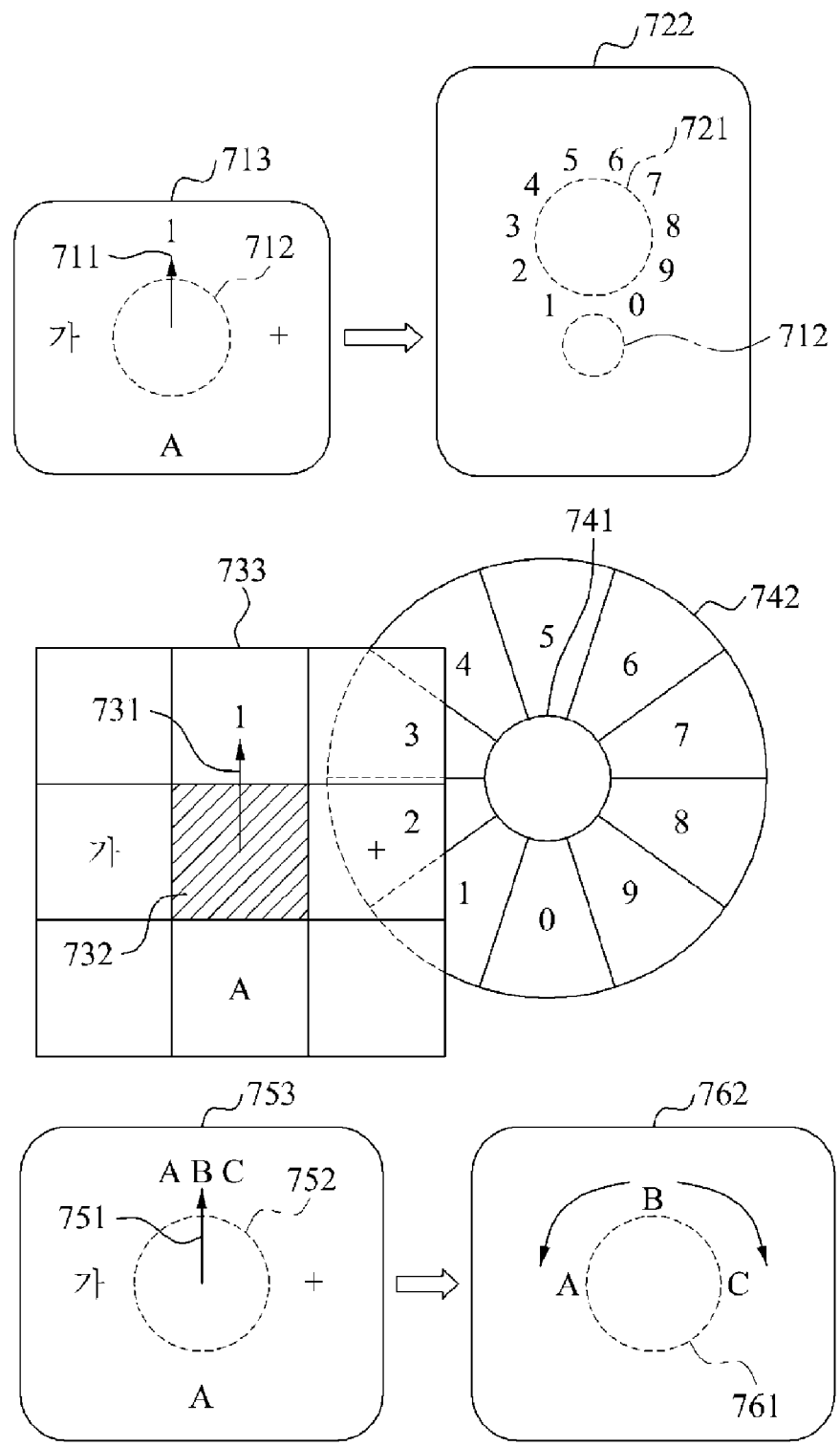
FIG. 7 is a diagram illustrating examples of resetting of a gesture region and feedback of a reset gesture region.

FIG. 7 is a diagram illustrating examples of resetting of a gesture region and feedback of a reset gesture region. Referring to FIG. 7, when a gesture for moving from at least one basic region to any one navigation region among at least one navigation region is recognized, at least one gesture region may be reset in response to the recognition of the gesture. In one example, when a gesture 711 for selecting a number navigation region within a navigation region 713 is recognized, a gesture region may be reset in a same space as the navigation region 713. The reset gesture region may include two basic regions 712 and 721 and ten navigation regions 722.

In another example, when a gesture 731 for selecting a number navigation region in first gesture regions 732 and 733 in a shape of a square, for example, is recognized, second gesture regions 741 and 742 may be provided. The second gesture regions 741 and 742 may have a circular shape, and a select gesture and a confirm gesture in the second gesture regions 741 and 742 may be recognized based on a difference in depths between the first gesture regions 732 and 733 and the second gesture regions 741 and 742. For example, when a gesture is detected in a space corresponding to the first gesture regions 732 and 733, at least one of a select gesture and a confirm gesture in the first gesture regions 732 and 733 may be recognized. When a gesture of a user is detected in the second gesture regions 741 and 742 having a deeper depth than the first gesture regions 732 and 733, at least one of a select gesture and a confirm gesture in the second gesture regions 741 and 742 may be recognized. Also, the first gesture regions 732 and 733 and the second gesture regions 741 and 742 may be all fed back to the user visually, and the user may execute the gesture while referring to the visual feedback information.

In another example, when a gesture 751 for selecting any one navigation region in gesture regions 752 and 753 is recognized, second gesture regions 762 and 762 may be provided. When the second gesture regions 762 and 763 are fed back to the user visually, a configuration for moving between navigation regions and items respectively corresponding to the navigation regions in a form of a wheel may be fed back to the user visually.

Figure 8:
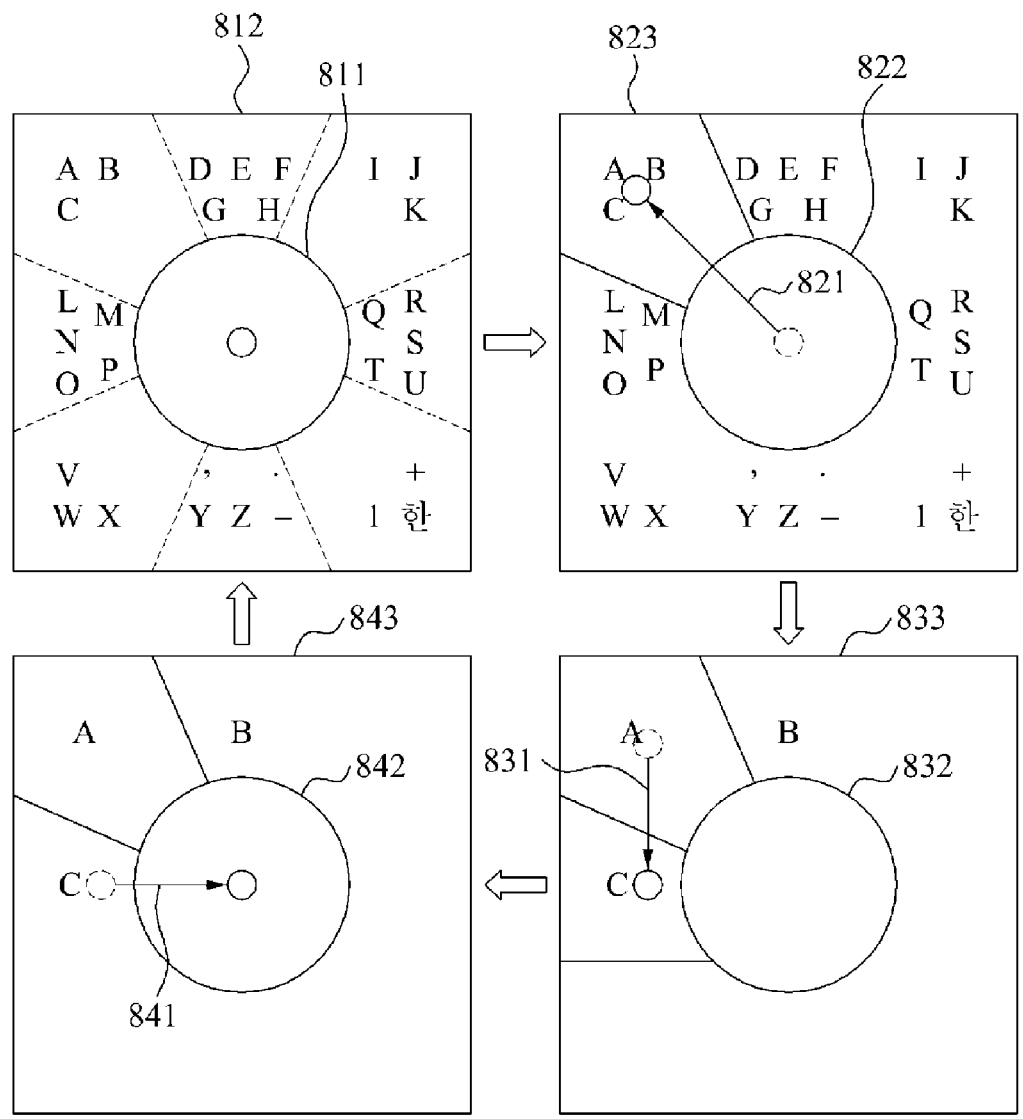
FIG. 8 is a diagram illustrating an example of a method for a user interface based on a gesture.

FIG. 8 is a diagram illustrating an example of a method for a user interface based on a gesture. Referring to FIG. 8, a gesture region may include one basic region 811 and eight navigation regions 812. Also, each of the eight navigation regions 812 may include a grouped character item. To input an alphabet letter 'C', a gesture 821 for moving to a navigation region 823 including alphabet letters 'A, B, C' among the eight navigation regions 812 may be input. A movement direction of the gesture 821 may correspond to a direction of an outward movement from a basic region 822 to the navigation region 823. In response to the recognition of the gesture 821, the gesture regions 811 and 812 may be reset to gesture regions 832 and 833. Accordingly, a gesture 831 for selecting the alphabet letter 'C' in the gesture regions 832 and 833 may be recognized. When a confirm gesture 841 in a direction of an inward movement from a navigation region 843 including a selected item to a basic region 842 among the gesture regions 842 and 843 is recognized, the second gesture regions 842 and 843 may be reset to the first gesture regions 811 and 812 after an input of the alphabet letter 'C' is performed.

Figure 9:
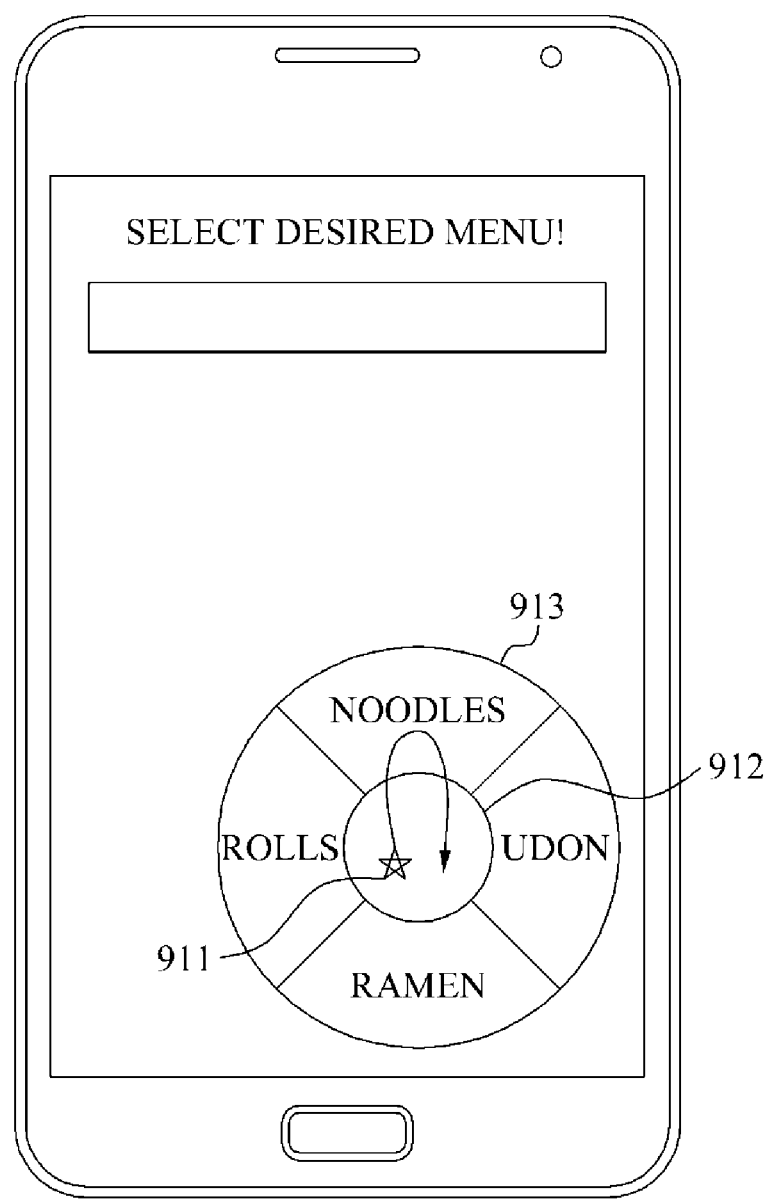
FIG. 9 is a diagram illustrating an example of an object to be tracked.

FIG. 9 is a diagram illustrating an example of an object to be tracked. Referring to FIG. 9, an object to be tracked may be a physical object or a virtual object. In one example, a user may select any one item among a plurality of items using a mobile device. In this example, the object to be tracked may be a virtual object. Also, in a case in which the user executes a gesture by shaking or tilting the mobile device, the user may control a motion of the virtual object using an input device such as a sensor. For example, in a case in which an input of a menu is performed using the mobile device, a gesture region including a basic region 912 and four navigation regions 913 may be set based on a preset location. Also, a gesture of an object 911 to be tracked may be detected using an input device such as, for example, an accelerometer sensor, a gyro sensor, a motion recognition sensor, and the like. The object 911 to be tracked may be fed back to the user visually or may not be fed back. By recognizing the gesture, in a case in which a select gesture for moving the object 911 to be tracked from the basic region 912 to the navigation region 913 including a "noodles" item among the four navigation regions 913 and a confirm gesture for moving the object 911 to be tracked back to the basic region 912 are recognized, an input of the "noodles" item may be performed. A gesture of actually tilting the mobile device or a gesture of moving a hand of the user recognized through a motion recognition sensor installed in the mobile device may be used as the gesture.

FIG. 10 is a diagram illustrating another example of a method for a user interface based on a touch gesture. Referring to FIG. 10, at least one touch gesture and at least one slide gesture may be detected using a touch screen. At least one gesture region may be set based on a preset location or an initial location of a touch gesture, such that a location of a gesture region may not match a location of an item on a display. For example, when a touch gesture at a lower part of a mobile device is recognized, gesture regions 1011 and 1012 may be set based on an initial location of the touch gesture. Items 1021 may be set at a preset location. Based on the gesture region, an input gesture in the gesture regions 1011 and 1012 may be recognized based on at least one of a location of the touch gesture and a direction of the slide gesture. The recognition of the input gesture may be further based on at least one of a length and a speed of the slide gesture. For example, a slide gesture 1031 having a short length in an eleven o'clock direction may be recognized as a Korean letter 'ㄱ'. A slide gesture 1032 having a short length and starting in the eleven o'clock direction and ending in a three o'clock direction may be recognized as a Korean letter 'ㅋ'. A slide gesture 1033 having a short length and starting in the eleven o'clock direction and ending in a six o'clock direction may be recognized as a Korean letter 'ㄲ'.

Alternatively, a slide gesture 1041 having a short length in the eleven o'clock direction and having a starting location that is different from a starting location of the gesture 1031 may be recognized as the Korean letter 'ㄱ'. A slide gesture 1043 having a long length in the eleven o'clock direction may be recognized as the Korean letter 'ㅋ'. Even in a case in which a slide gesture 1042 extends beyond the gesture regions 1011 and 1012, the gesture 1042 extending beyond the gesture regions 1011 and 1012 may be recognized as the Korean letter 'ㅋ' by recognizing the input gesture based on any one of the location of the touch gesture and the length of the slide gesture. A slide gesture 1044 having a short length and reciprocating in the eleven o'clock direction and a five o'clock direction may be recognized as the Korean letter 'ㄲ'.

Figure 11A:
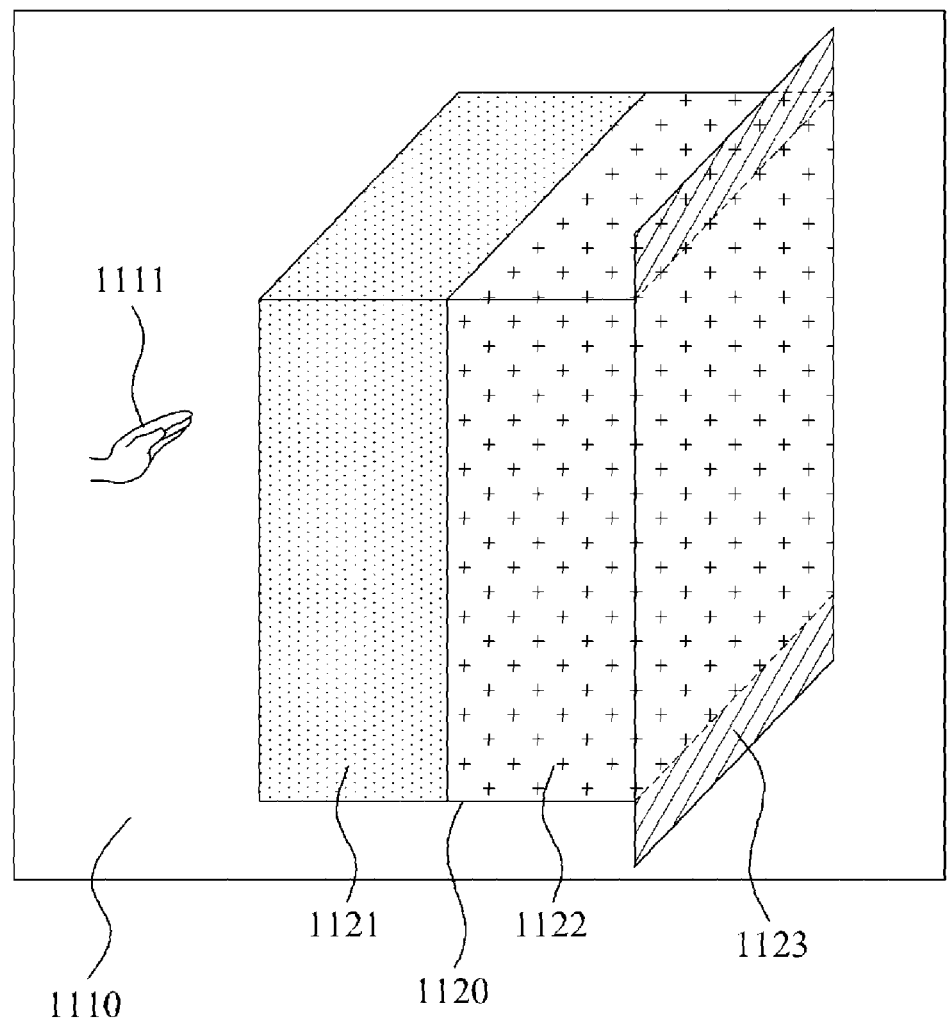

FIGS. 11A and 11B are diagrams illustrating another example of a method for a user interface based on a gesture. Referring to FIG. 11A, at least two regions are set based on a depth from a preset location or a detected location of at least one object to be tracked. As described in the foregoing, the depth may be a distance between the object to be tracked and a display for providing visual feedback information.

The at least two regions are in a gesture region. For example, a gesture region 1120 may include a first region 1121 and a second region 1122 as shown in FIG. 11A. The first region 1121 and the second region 1122 are set based on the depth from the preset location or the location of the at least one object to be tracked. The at least two regions may be a region in which at least one function among functions corresponding to the at least two regions is performed on an item.

For example, the first region 1121 may be a region in which a user may move or point out an item, for example, a cursor, using an object 1111 to be tracked. The second region 1122 may be a region in which the user may select or execute the item using the object 1111 to be tracked. Alternatively, the second region 1122 may be a region in which the item may be moved or pointed out by the object 1111 to be tracked, and the first region 1121 may be a region in which the item may be selected or executed by the object 1111 to be tracked. Also, in another example, the item may be moved, pointed out, selected, or executed by moving the object 1111 to be tracked between the regions. For example, when the object 1111 to be tracked is moved from the first region 1121 to the second region 1122, the item may be pointed out, and when the object 1111 to be tracked is moved from the second region 1122 to the first region 1121, the item may be executed.

Location information and a gesture of the object to be tracked in the gesture region may be recognized, and based on the location information and the gesture of the object to be tracked, at least one of a function corresponding to the first region, a function corresponding to the second region, and a function corresponding to movement of the object to be tracked between the regions may be recognized.

In an example of FIG. 11A, the item may be fed back to the user visually through a display 1123, for example, a monitor. The gesture of the object to be tracked in an inactive region 1110 other than the gesture region 1120 may be ignored. The inactive region 1110 may be a region in which the gesture of the object to be tracked is not recognized. For example, the inactive region 1110 may be a region having a deeper depth from the display 1124 than the depth of the first region 1121 from the display 1123.

Referring to FIG. 11B, at least two regions 1142 and 1143 are set based on a depth from a preset location or a location of at least one object 1136 to be tracked. In one example, a first reference plane 1134 and a second reference plane 1135 may be set relatively based on a location of the object 1136 to be tracked and a location of a display 1150. A distance from the at least one object 1136 to be tracked to the second reference plane 1135 is deeper than a distance from the at least one object 1136 to be tracked to the first reference plane 1134. A region corresponding to a depth 1132 between the first reference plane 1134 and the second reference plane 1135 may be set as the first region 1142, and a region corresponding to a depth 1133 between the second reference plane 1135 and the display 1150 may be set as the second region 1143. A region having a depth 1131 deeper than a depth between the display 1150 and the first reference plane 1134 may be set as an inactive region 1141.

Also, in another example, the at least two regions 1142 and 1143 may be set based on a preset location, irrespective of the location of the object 1136 to be tracked. For example, the first reference plane 1134 and the second reference plane 1135 may be set based on a preset method, for example, a preset distance from the display 1150, irrespective of the location of the object 1136 to be tracked. The first region 1142 and the second region 1143 may set based on the preset first reference plane 1134 and the preset second reference plane 1135.

In one example, the gesture region may be reset in response to recognition of the gesture in the first region 1142 and the second region 1143. In another example, the at least two regions may be reset based on the depth from the preset location or the location of the at least one object 1136 to be tracked in response to execution of a program or an application for implementing the method for a user interface based on a gesture. The gesture region may be partitioned into N regions.

Location information and a gesture of the at least one object to be tracked within the gesture region may be recognized. The location information may include information associated with a depth, for example, information associated with a depth from the object 1136 to be tracked to the display 1150. Specifically, the depth of the at least one object to be tracked may be extracted using a proximity sensor, a depth sensor, or a stereo-type sensor. Based on the extracted depth, a determination may be made as to whether the gesture of the at least one object to be tracked may be executed in the first region or the second region among the two regions classified by the preset reference planes.

A gesture in the inactive region other than the gesture region may be ignored. Accordingly, only a gesture in the gesture region may be detected. In one example, the gesture of the at least one object to be tracked may be at least one of tab selection, toggle selection, scroll tab selection and movement.

The display 1150 may visually feed back a plurality of items 1160 and 1171 through 1179 to the user. In the example of FIG. 11B, the plurality of items may include a cursor 1160 and a plurality of applications 1171 through 1179.

At least one of the functions corresponding to the at least two regions may be recognized based on the location information and the gesture of the at least one object to be tracked. In one example, at least one of a function corresponding to the first region, a function corresponding to the second region, and a function corresponding to movement between the regions may be recognized. For example, 1) a "point" function or a "move" function in the first region may be recognized, and 2) after a "point" function or a "move" function in the first region is recognized, an "execute" function for any one item among a plurality of items in the second region may be recognized. Also, 3) after a "point" function or a "move" function in the first region is recognized, a "select" function for any one item among a plurality of items in the second region may be recognized, and 4) after a "point" function or a "move" function in the first region is recognized and a "select" function for any one item among a plurality of items in the second region is recognized, a "move" function 1144 may be recognized again. In a case of the example 4), a third region (not shown) may be set in response to the recognition of the "select" function in the second region. Accordingly, the "move" function 1144 in the third region may be recognized.

In one example, the cursor 1160 may be moved with the movement of the object 1136 to be tracked. For example, in a case in which the object 1136 to be tracked is moved from left to right within the first region 1142, the cursor 1160 may be moved from left to right on the display 1150.

In one example, a motion mode may be recognized by recognizing the preset gesture of the at least one object to be tracked. For example, when a movement speed of the at least one object to be tracked is less than a preset threshold value, a motion mode may be recognized as a navigation mode. Accordingly, a motion of the at least one object to be tracked within the first region may correspond to a "point" function or a "move" function. When the movement speed of the at least one object to be tracked is higher than or equal to the preset threshold value, the motion mode may be recognized as a command mode. Accordingly, the motion of the at least one object to be tracked within the first region may be recognized as a command function corresponding to the command mode. As a specific example, when the movement speed of the at least one object to be tracked within the first region is higher than or equal to the preset threshold value, the gesture region may be reset by recognizing the motion mode as the command mode.

In one example, in a case in which the object to be tracked is plural, at least one of the functions corresponding to the at least two regions may be recognized by a combination of locations and gestures of the plurality of objects to be tracked.

Figure 12:
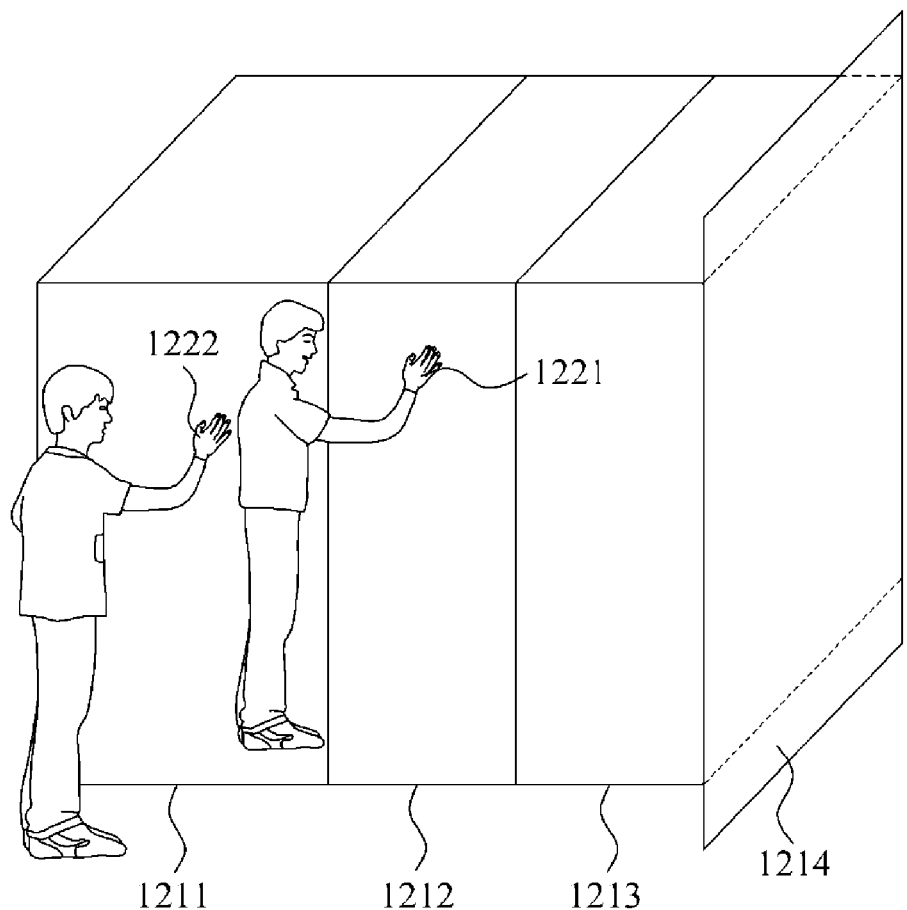
FIG. 12 is a diagram illustrating an example of an inactive region in a method for a user interface based on a gesture.

FIG. 12 is a diagram illustrating an example of an inactive region in a method for a user interface based on a gesture. Referring to FIG. 12, a first region 1212 and a second region 1213 are set in a predetermined space. Specifically, the first region 1212 and the second region 1213 are set at preset locations, and are set based on a depth, that is, a relative position, between at least one object to be tracked and a display 1214. An inactive region 1211 is set in a region having a deeper depth than a depth between the display 1214 and the first region 1212. The inactive region 1211 may be a region in which a gesture of the object to be tracked is not recognized.

For example, in a case in which a hand 1221 of a first user is within the first region, the hand 1221 of the first user may be recognized as an object to be tracked, and at least one of the functions corresponding to the first region 1212 may be recognized by recognizing location information and a gesture of the hand 1221 of the first user. When a second user moves to the inactive region 1211, a motion of the second user may be ignored, and the location information and the gesture of the hand 1221 of the first user may still be recognized. Also, even though a gesture is executed using a hand 1222 of the second user, if the hand 1222 of the second user is within the inactive region 1211 rather than the first region 1212 or the second region 1213, a location, a motion, or a gesture of the hand 1222 of the second user may be ignored.

Figure 13:
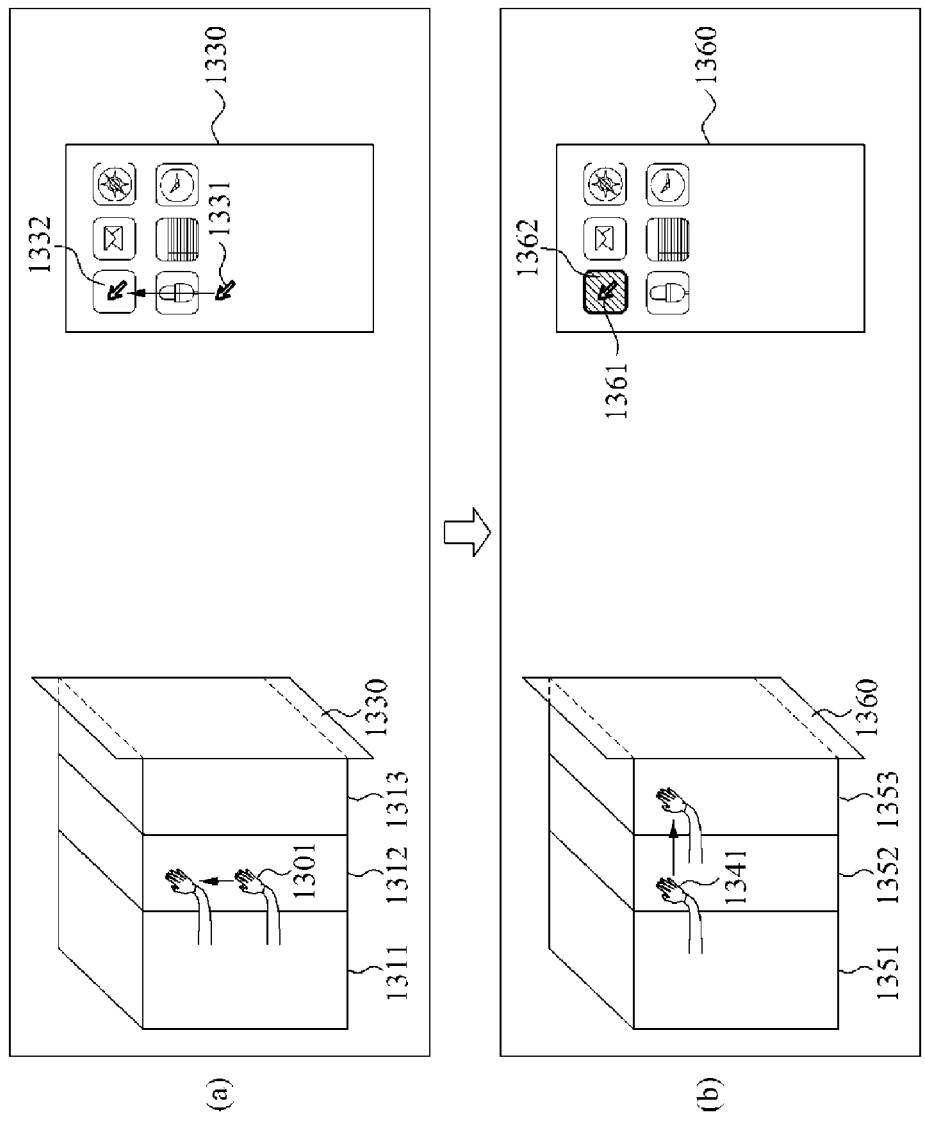
FIG. 13 is a diagram illustrating another example of a method for a user interface based on a gesture.

FIG. 13 is a diagram illustrating another example of a method for a user interface based on a gesture. In (a) of FIG. 13, an object 1301 to be tracked and a display 1330 are located in a predetermined region. A first region 1312, a second region 1313, and an inactive region 1311 are set based on a depth, that is, a relative position or preset position between the object 1301 and the display 1330. A plurality of items, for example, applications, and a cursor 1331 may be provided on the display 1330. The cursor 1331 may be moved with the movement of the object 1301 to be tracked. For example, in a case in which the object 1301 to be tracked is moved up, the cursor 1331 may be moved up. Accordingly, the cursor 1331 may be overlaid on one item 1332 among the plurality of items.

In (b) of FIG. 13, when an object 1341 to be tracked is moved from a first region 1352 to a second region 1353, location information and a gesture of the object 1341 to be tracked may be recognized. In a case in which a function corresponding to the gesture is a select function, the select function may be recognized based on the location information and the gesture of the object 1341 to be tracked. An item 1362 may be clicked by the gesture. In a case in which the object 1341 to be tracked is moved from the first region 1352 to an inactive region 1351, the gesture may be ignored.

Figure 14:
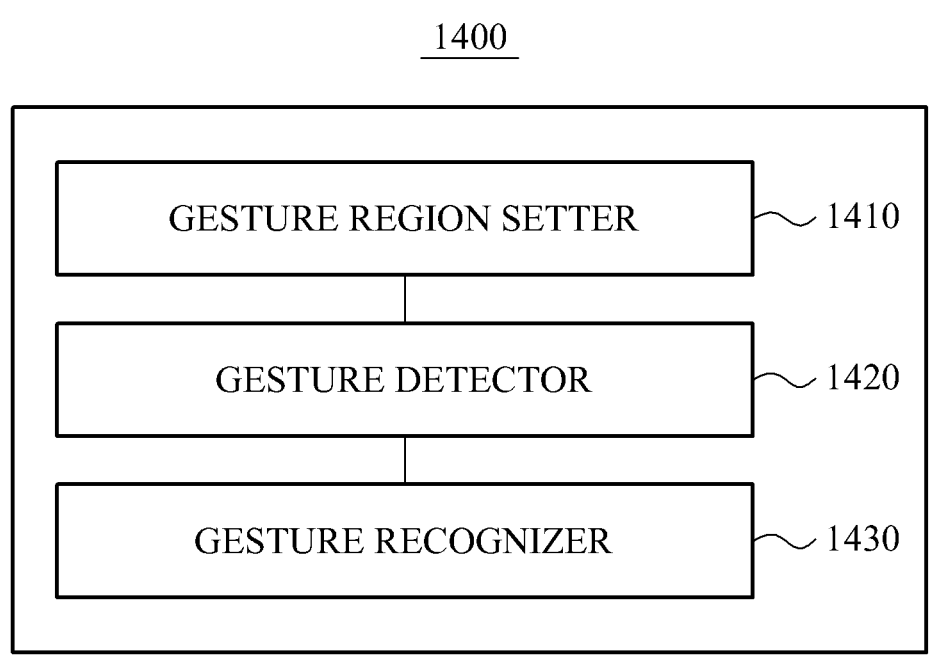
FIG. 14 is a block diagram illustrating an example of an apparatus for a user interface based on a gesture

FIG. 14 is a block diagram illustrating an example of an apparatus for a user interface based on a gesture. Referring to FIG. 14, a gesture region setter 1410 sets at least one gesture region including at least one basic region and at least one navigation region based on a preset location or a detected location of at least one object to be tracked.

A gesture detector 1420 detects a gesture of the at least one object to be tracked using an input device.

A gesture recognizer 1430 recognizes, from the detected gesture, at least one of a select gesture for selecting any one item among at least one item included in the at least one navigation region and a confirm gesture for moving from the at least one navigation region to the at least one basic region.

The description provided above with respect to FIGS. 1-3, 4A, 4B, 5-10, 11A, 11B, 12, and 13 is also applicable to the apparatus for a user interface based on a gesture shown in FIG. 14, and will not be repeated here.

The gesture region setter 1410, the gesture detector 1420, and the gesture recognizer 1430 in FIG. 14 described above that perform the operations illustrated in FIGS. 1-3, 4A, 4B, 5-10, 11A, 11B, 12, and 13 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for a user interface based on a gesture, the method comprising:
    recognizing an object in the real world to be tracked using an input device;
    setting at least one gesture region in the real world comprising at least one basic region in the real world at a first depth and at least one navigation region in the real world at a second depth based on a preset location or a detected location of the object, wherein the first depth is a distance between the basic region and a display or the input device, and the second depth is a distance between the navigation region and the display or the input device;
    providing feedback of movement of the object to a user in real time using an output device;
    detecting a gesture of the object using the input device;
    recognizing, from the detected gesture, either one or both of a select gesture and a confirm gesture;
    recognizing a command gesture within the at least one gesture region or within a preset command region other than the at least one gesture region;
    identifying a command mode corresponding to the recognized command gesture; and
    performing a function corresponding to the command mode;
    wherein the recognizing of the command gesture comprises recognizing the command gesture based on any one or any combination of any two or more of information associated with a movement of the object within the at least one gesture region, information associated with a moving trace of the object, information associated with a movement speed of the object, and information associated with a shape of the object.

2. The method of claim 1, wherein the setting of the at least one gesture region comprises:
    setting any one region among the at least one basic region and the at least one navigation region based on the preset location or the detected location of the object; and
    setting a remaining region among the at least one basic region and the at least one navigation region based on a preset rule and the set any one region.

3. The method of claim 1, wherein the setting of the at least one gesture region comprises setting the at least one gesture region hierarchically.

4. The method of claim 1, wherein the at least one navigation region corresponds to at least one item; and
    the recognizing of the either one or both of the select gesture and the confirm gesture comprises:
        recognizing a navigation region select gesture moving from the at least one basic region to any one navigation region among the at least one navigation region; and
        recognizing an item select gesture selecting any one item among the at least one item.

5. The method of claim 1, wherein the recognizing of the either one or both of the select gesture and the confirm gesture comprises:
    resetting the at least one gesture region in response to the recognizing of the either one or both of the select gesture and the confirm gesture; and
    recognizing the either one or both of the select gesture and the confirm gesture from the detected gesture based on the reset at least one gesture region.

6. The method of claim 1, wherein the recognizing of the either one or both of the select gesture and the confirm gesture comprises recognizing the either one or both of the select gesture and the confirm gesture based on either one or both of a location of the object and a direction of movement of the object from the at least one basic region to the at least one navigation region, and either one or both of a location of the object and a direction of movement of the object from the at least one navigation region to the at least one basic region.

7. The method of claim 6, wherein the recognizing of the either one or both of the select gesture and the confirm gesture further comprises recognizing the either one or both of the select gesture and the confirm gesture based on any one or any combination of any two or more of information associated with movement of the object within the at least one gesture region, information associated with a moving trace of the object, information associated with a movement speed of the object, and information associated with a shape of the object.

8. The method of claim 1, wherein the recognizing of the command gesture further comprises recognizing a cancel gesture canceling the recognition of the either one or both of the select gesture and the confirm gesture.

9. The method of claim 8, wherein the cancel gesture comprises any one or any combination of any two or more of at least one preset cancel gesture, a gesture moving to a region other than a preset region, and a gesture unexecuting the confirm gesture during a preset period of time.

10. The method of claim 1, wherein the input device comprises any one or any combination of any two or more of a camera, a detection sensor, and an event-based image processing device.

11. The method of claim 10, wherein the event-based image processing device comprises a dynamic vision sensor (DVS).

12. The method of claim 1, wherein the output device comprises any one or any combination of any two or more of a display device, an audio device, a tactile device, an olfactory device, a gustatory device, an electric device, and a magnetic device.

13. The method of claim 1, wherein the object is a physical object.

* * * * *